United States Patent [19]

Haydock

[11] 4,001,100
[45] Jan. 4, 1977

[54] TREATMENT OF SUSPENSIONS AND SLURRIES BY ELECTROPHORESIS AND ELECTRO-OSMOSIS

[76] Inventor: James Livesey Haydock, 20 Victoria St., Toronto, Ontario, Canada

[22] Filed: Jan. 3, 1975

[21] Appl. No.: 538,328

[52] U.S. Cl. .......................... 204/180 R; 204/202; 204/300 R

[51] Int. Cl.² ....................... B03C 5/00; B03C 7/08

[58] Field of Search ...... 204/202, 206, 209, 180 R, 204/299, 300

[56] References Cited
UNITED STATES PATENTS

| 894,070 | 7/1908 | Schwerin | 204/300 X |
|---|---|---|---|
| 2,900,320 | 8/1959 | Metcalfe et al. | 204/300 |
| 3,396,097 | 8/1968 | Wolcott | 204/180 R X |
| 3,436,326 | 4/1969 | Stober | 204/180 R |
| 3,592,678 | 7/1971 | Honjo et al. | 204/300 |
| 3,649,507 | 3/1972 | Welter | 204/202 |

Primary Examiner—Arthur C. Prescott

[57] ABSTRACT

The solid content of aqueous suspensions is separated from the liquid phase by electrophoresis and electro-osmosis. An electrode assembly comprising two closely spaced mesh electrodes is placed in the suspension and a potential is applied between the electrodes so that the solids in the suspension migrate to one electrode where they are electro-osmotically consolidated, the consolidated material being periodically removed. Preferably the assembly comprises collapsible spacer means which are periodically collapsed in order to squeeze out the consolidated material.

12 Claims, 3 Drawing Figures

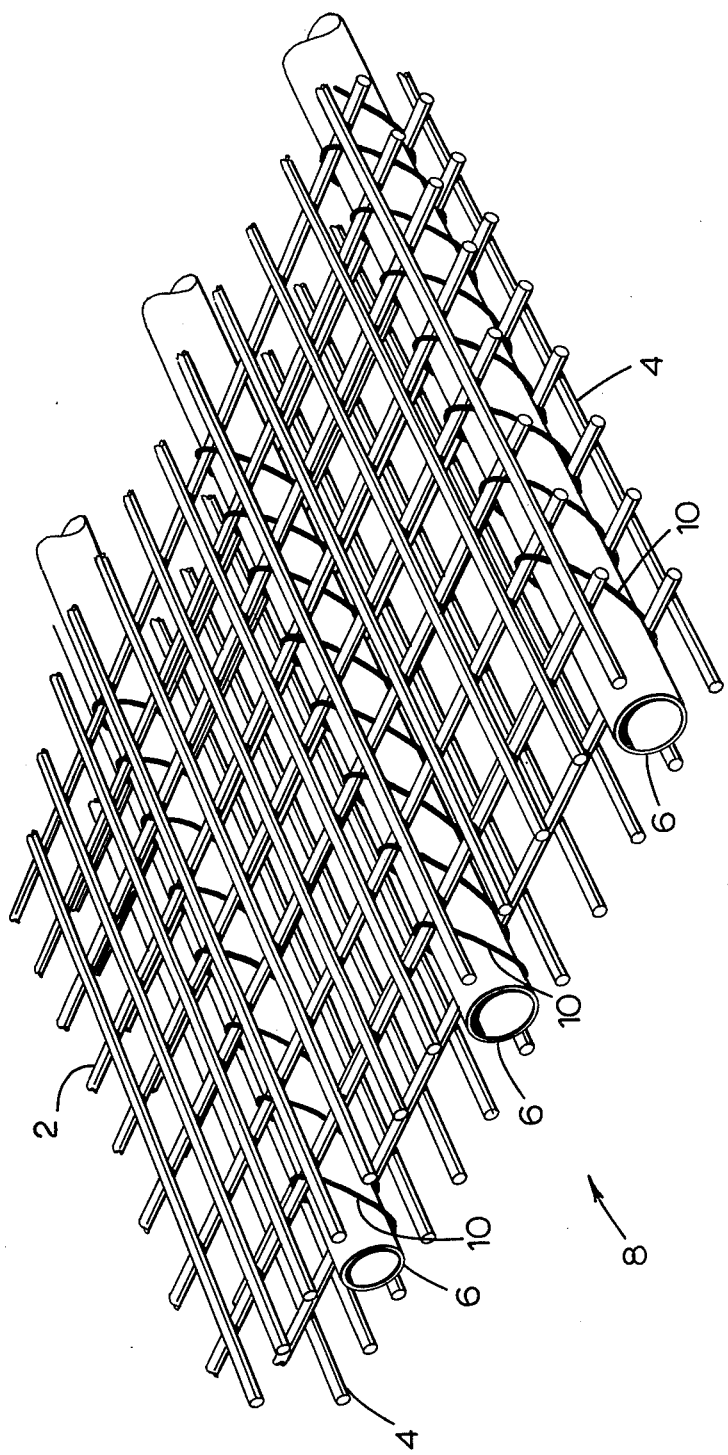

TREATMENT OF SUSPENSIONS AND SLURRIES BY ELECTROPHORESIS AND ELECTRO-OSMOSIS

FIELD OF THE INVENTION

This invention relates to the removal of particulate material from aqueous suspensions of the material.

DESCRIPTION OF THE PRIOR ART

Known methods of performing this operation involve settlement by gravity, centrifuging, filtration, and flocculation by chemical treatment followed by separation of the flocculated particles. However, some of these treatments are uneconomical for large scale use in certain applications, and some suspensions are not readily amenable to these treatments: thus the suspension may be too stable for settlement to occur at an acceptable rate, or at all. The particulate material may be such as to cause rapid clogging of filters, and chemical treatment may either be ineffective, too expensive, or introduce unacceptable contamination into the aqueous phase. Moreover, when settlement is relied upon, the settled particulate material often has an unacceptably high residual liquid content. These problems tend to be particularly acute with certain slurries of clay like materials.

In the present invention use is made of phenomena of electrophoresis and electro-osmosis is secure substantial separation of an aqueous suspension of a particulate material into its component phases.

Electrophoresis and electro-osmosis are well known physical phenomena. Both depend upon the presence of electrostatic charges (which may be positive or negative but usually the latter) concentrated in a very thin layer at the surface of a small solid particle when immersed in a fluid and a charge of opposite sign distributed in the adjacent fluid in the form of ions.

In the presence of an electric field tractive forces result which tend to cause relative movement between particles and fluid. Where the solid particles are dispersed in the fluid and both particles and fluid are mobile, the relative movement is referred to as electrophoresis. Electro-osmosis, on the other hand, as applied to the consolidation of sediments, refers to the process of squeezing out fluid (usually water) from the pores of a sediment, the sediment itself having a fairly immobile and well-defined structure.

These phenomena have been used together previously in processes which incidentally involve separation of the solid content of a suspension, for example in the ceramic art in order to produce castings from clay slips. However, such utilization has been in specific applications where mere separation of the solid and liquid contents of a suspension was not the primary consideration, or where a relatively substantial use of electric power relative to the quantity of solid material handled was acceptable. Such known applications of electrophoresis and electro-osmosis would not be suitable for the bulk separation of solid material from suspensions at low cost.

SUMMARY OF THE INVENTION

The object of the present invention is to provide a method and apparatus for separating the solids content of a suspension which can be utilised economically on a large scale without excessive consumption of electric power.

According to the invention, a method of removing particulate material from an aqueous suspension comprises forming the suspension into a thin layer between two generally parallel bounding structures separated by a distance which is very small compared with the dimensions of the bounding structures, setting up a directional electric field in the layer of suspension such as to cause electrophoretic migration of the suspended particles towards one of the bounding structures and electro-osmotic consolidation of the particles adjacent said bounding structure, and removing the consolidated particles from the vicinity of said one bounding structure.

Conveniently, the bounding structures are electrodes between which an electrical potential is applied; since the aqueous phase of a suspension being treated is an electrolyte, the potential between the electrodes must be kept sufficiently low to preclude substantial electrolytic decomposition. Such decomposition in the context of the present invention is unproductive and may be dangerous where there is a possibility of explosive recombination of oxygen and hydrogen liberated by electrolysis. The spacing between the electrodes should therefore be maintained small enough to provide a potential gradient sufficient to result in electrophoresis occurring at an acceptable rate, and an acceptable degree of electro-osmosis, without the potential between the electrodes being so high as to cause substantial electrolytic decomposition of the aqueous phase.

In a preferred form of the invention, the electrodes are formed into an electrode assembly in which the spacing between them is maintained by insulating spacer means, at least one of the electrodes being perforate so that the suspension enters the space enclosed between the electrodes. A wire mesh structure for the electrode is preferred.

In one particularly advantageous form of the invention, the insulating spacer means between the electrodes is collapsible, and consolidated solids accumulating in the electrode structure are periodically squeezed out of the structure by collapsing the spacer means.

The invention extends to apparatus for implementing the method of the invention, this apparatus in its broadest aspect comprising two generally parallel bounding structures separated by a distance which is very small compared with the dimensions of the bounding structures, means for causing suspension to be separated to flow into the space between the bounding structures, means for setting up a directional electric field between the bounding structures having a potential gradient sufficient to cause electrophoretic migration of particles suspended between the structures towards one of said structures, and means for removing particles accumulating adjacent said one bounding structure.

In a preferred form of the apparatus, the bounding structures are electrodes formed of electrically conductive mesh, spacing between the electrodes normally being maintained by collapsible spacer means. Means are provided for periodically collapsing the spacer means so as to express from the electrode assembly consolidated material accummulated therein.

BRIEF DESCRIPTION OF THE DRAWINGS

The invention is described further with reference to the accompanying drawings in which:

FIG. 3 is broken away view on an enlarged scale of part of an electrode assembly suitable for use in the apparatus of FIGS. 1 and 2.

DESCRIPTION OF THE PREFERRED EMBODIMENTS

Figure 1:
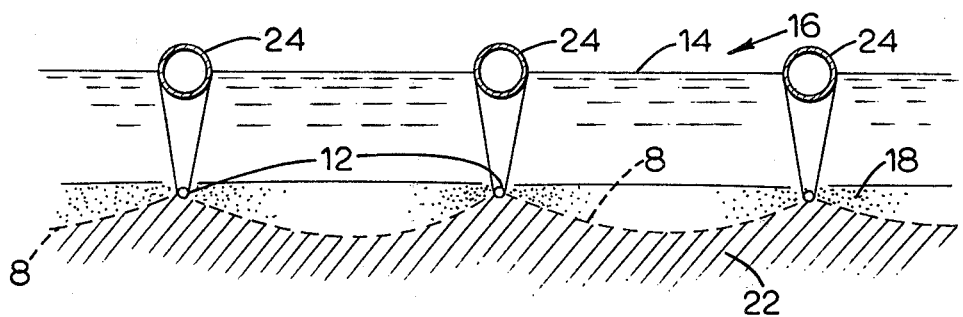
FIG. 1 is a diagrammatic vertical cross-section through apparatus in accordance with a first embodiment of the invention.

Referring to FIG. 3, the heart of preferred forms of apparatus in accordance with the invention is an electrode assembly, one exemplary form of which is shown in that figure. This assembly 8 comprises in the embodiment shown a first wire mesh 2, a second wire mesh 4, and spacer members 6. The mesh electrodes 2 and 4 allow easy access of a suspension to be separated into the interior of the assembly, the spacer members being arranged so as not substantially to obstruct this access. A DC potential may be applied between the electrodes so that the electrode 2 forms an anode and the electrode 4 a cathode. The electrodes are of much greater extent than the portions shown in FIG. 3, their dimensions being very large in magnitude as compared with the distance between them.

The material of the meshes used form the electrodes will depend upon the nature of the suspension being treated. It is necessary to avoid appreciable electrolytic attack upon the electrodes, and in addition, any corrosive properties of the suspension itself must be taken into account. In a typical case of water insoluble mineral material suspended in water, the anode mesh may suitably be of nickel wire, whilst the cathode mesh, which will not be subject to electrolytic attack, may be of steel wire.

With most suspensions, electrophoresis and electro-osmosis will result in accummulation and consolidation of the suspended material occurring at the anode mesh when the electrode assembly 8 is submerged in a suspension and a potential applied between the anode and cathode meshes. For this reason, it is preferred to form at least the anode mesh of relatively heavy gauge wire (for example one-sixteenth to one-eighth diameter) and with a relatively open mesh (for example ½ inch to 1 inch spacing between wires). The cathode mesh may be of much lighter gauge wire and may have a finer mesh size so as to assist in setting up a uniform field between the electrodes; or both meshes may be identical, as shown, so that the polarity of the electrodes may be changed over if necessary in order to equalize electrolytic erosion.

In the assembly just described, the rate of electrophoresis will depend on the potential gradient between the electrodes, which in turn will depend upon the potential applied between the electrodes and the distance between them. In typical applications, the potential which can be applied between the electrodes without the occurence of excessive electrolysis will be in the range 2–5 volts depending upon the hydrogen and oxygen overvoltages occurring at the electrodes. The higher the potential between the electrodes, the higher will be the unproductive dissipation of electric energy in the resistance formed by the suspension.

Since only a small potential may be applied between the electrodes, a correspondingly small electrode separation is required in order to obtain an acceptably high rate of electrophoresis, and an acceptably high degree of electro-osmotic compaction of solids separated from a suspension. This separtion must always be very small relative to the area of the electrodes of acceptable productivity to be obtained, but should not be so small as restrict unduly the quantity of separated solids that may be accumulated in the electrode assembly. In practice, a separation of ½ to 1 inch will usually be satisfactory, the dimensions of the electrodes being such as to provide an area of many square feet. The actual dimensions will vary according to the construction of the apparatus in which the electrode assembly is incorporated, as will be better understood from the description of exemplary embodiments of such apparatus to be found later in this specification.

The spacer members 6 shown in FIG. 3 are formed by tubes of flexible resilient synthetic plastics material, which are secured to the meshes 2 and 4 by tie loops 10. The tubes have a diameter equal to the required spacing between the electrodes. However, by externally applied mechanical pressure, or by evacuating the interior of the tubes by means not shown, the tubes can be caused to collapse thus resulting in the meshes 2 and 4 being closed up towards one another and squeezing out material from between the meshes.

The spacer means provided by this form of spacer members represents only one possible construction, and any means may be employed which will function to maintain a desired spacing between the electrode meshes without causing a short circuit between them. In preferred embodiments of the invention the spacer means must also be collapsible so as to permit the spacing between the meshes to be greatly reduced as in the construction already described. Thus the tubes may be replaced by an expanded plastic mesh having a large void volume and which is resiliently collapsible in thickness under the influence of pressure, or by a non woven mat of bonded resilient fibres, the mat having a very open texture so as not appreciably to hinder the passage of the suspension being separated.

The electrode meshes may be of either welded or woven mesh, of expanded metal, or of any other electrically conductive openwork structure which provides sufficient physical strength to withstand the handling to which the electrode assembly may be subject, and which is readily separated from solids accumulated during operation of the assembly.

A first embodiment of apparatus according to the invention is shown in FIG. 1. An electrode assembly 8 as already described with reference to FIG. 3 is suspended from flotation chambers, which may be an interconnected grid of pipes 24 of synthetic plastics material, beneath the surface 14 of a setting pond 16.

Alternatively, the electrode assembly may be supported from poles, piles, or an external overhead suspension system in such a way that the meshes may be raised or lowered progressively. The arrangement is such that by varying either the level of the surface 14 or that of the electrode assembly, the latter is maintained at an interface between consolidated solids 22 and a layer 18 of the suspension to be treated, which together with a layer 20 of clarified liquid forms a liquid phase.

In the embodiment shown in FIG. 1 the upper electrode mesh of the assembly 8 is at earth or negative potential, whilst the lower mesh has a positive potential relative to the upper mesh: this particular configuration is suitable when the suspended particles carry negative charges. Where they carry positive charges the arrangement would be reversed.

The suspension to be treated, which may be a slurry, is discharged at controlled rates from distribution pipes 12 located under the flotation chambers. Alternative means may be used to supply the suspension to distributed points above or adjacent the electrode assembly so as to maintain the layer 18.

The suspension will always in practice have a higher density than the suspending liquid and will be carried by density currents to the interface between the liquid phase and the consolidated solids where it spreads out to form the layer 18. Here, at the interface, it is subjected to the action of the electric field set up by the electrode assembly 8 and eletrophoresis and electro-osmosis take place in the thin layer of suspension between the meshes at a high rate and with lower power consumption. The clarified aqueous liquid so produced, having a lower density than the surrounding suspension, migrates to the clarified liquid layer 20 above the layer 18 and is replaced by slurry which enters the space between the electrode meshes from the layer 18 thus keeping this space charged with the suspension to be treated.

The process is controlled so that it always takes place in a limited zone close to the interface between the consolidated solids and the liquid phase without changing the configuration of the system, the rate of feeding the suspension, or the concentration of solids in the suspension. This may be achieved by:

a. Varying the potential applied across the electrode meshes;

b. Controlling the level of the pond surface 14 by pumping in or out of the settling pond 16 between the layer 20 and a separate tank or pond;

c. Raising or lowering the support points of the meshes where the poles, piles, or an external suspension system is utilized.

Should too much consolidated material begin to adhere to the lower mesh, it can be cleaned by temporarily reversing the voltage. If, for example, the lower mesh forms the anode of the assembly (attracting negatively charged particles), then giving it a negative potential will cause rapid shrinkage of the solids away from the wires of the mesh, with the introduction of a film of water beneath the solids and the wires. Either the adhering consolidated solids will be shed onto the layer 22 or the action will permit the mesh to be withdrawn upwardly through the consolidated solids. If necessary, a regular cycle of consolidation by passing current in one direction followed by a short period of reversed current to reject the consoldiated solids may be incorporated in the process.

Electrically, the electrode assembly would be formed, in plan, by a fairly large number of separate assemblies, individual assemblies being connected in series electrically (anode - cathode - anode - cathode, etc.). A desired low potential across the individual electrode assemblies can thus be achieved while raising the potential across the system as a whole. This reduces the current demand on an electric power supply system supplying assemblies.

In an alternative embodiment of the invention, an electrode assembly or assemblies are utilized not only to separate and consolidate the solids, but also to convey them away from the zone of separation. Thus separation and consolidation may be arranged to take place between a stationary electrode mesh or meshes and a conductive, moving, conveyor belt type electrode so that, as the solids are continuously deposited and consolidated on the moving electrode belt they are conveyed out of a tank or basin to a secondary disposal system which removes them from the belt, for example onto an additional conveyor belt system.

Alternatively, the electrode assemblies may be formed into movable belts, screens or grids, arranged in a tank or basin in such a way that the suspended sediment is attracted to the belts, screens or grids, is conveyed in a generally downward direction, adhering to the electrode assemblies, and is then deposited in consolidated form into a zone of the tank or basin below the electrode assemblies. The solids may be allowed to accumulate or be removed continuously or intermittently by means of a secondary removal system.

Figure 2:
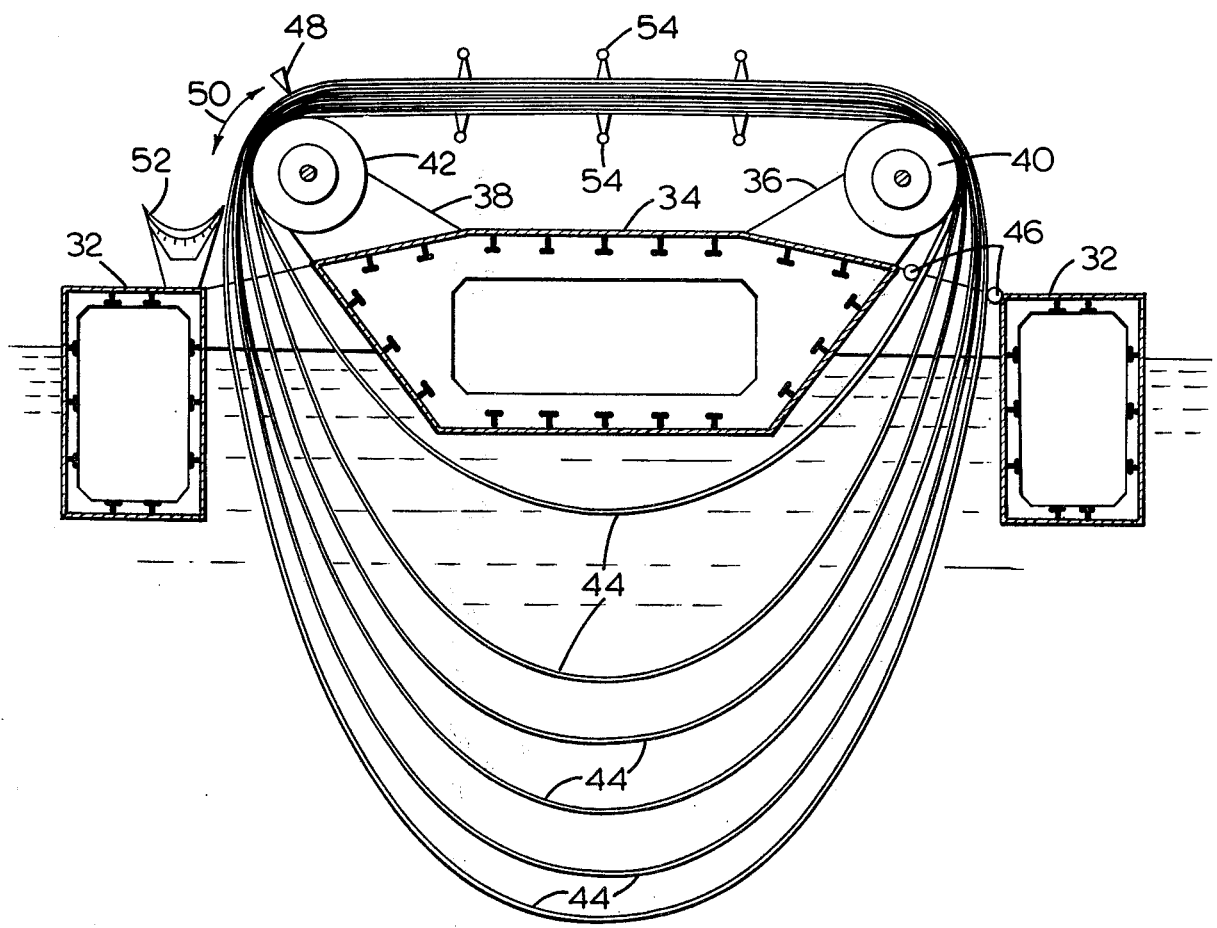
FIG. 2 is a diagrammatic vertical cross-section through apparatus in accordance with a second embodiment of the invention.

One such embodiment of the invention is shown in FIG. 2, this embodiment also employing an alternative method of freeing consolidated solids from the electrode assemblies. The apparatus used comprises a separating assembly which floats on the surface 30 of a pond or tank containing a suspension to be separated, being supported by interconnected buoyancy chambers 32 and 34. The buoyancy chamber 34 has outwardly projecting arms 36, 38 supporting rollers 40 and 42 respectively. Suspended from these rollers are a number of belts 44 arranged one within another, the lengths of the belts increasing from the innermost belt to the outermost belt. The belts are arranged so that they pass beneath the chamber 34 through the suspension contained in the pond or tank, a substantial portion of the length of each belt being beneath the surface 30. The belts are formed by electrode assemblies such as have been described with reference to FIG. 3. The lengths of the belts differ so that the submerged portions follow separate paths through the suspension, as shown.

The electrode assemblies are connected to a power supply (not shown) by means of contacts 46, and preferably the assemblies are arranged so that adjacent electrodes on adjacent belts are at the same potential, thus making it unnecessary to provide connections between adjacent belts or insulation in order to avoid short circuits between belts. The belts may be driven continuously or intermittently by the roller 40, which in turn is driven by an electric motor (not shown).

Assuming that the roller 40 is driven continuously in a clockwise direction as shown in FIG. 2, then a given portion of any of the belts will in turn pass downwardly past the contacts 46, which will each comprise a brush skid or roller arrangement to maintain contact with the moving belt. The belt will then pass beneath the surface 30, whereupon the space between the electrodes of the electrode assembly 8 (see FIG. 3) forming the belt become filled with the suspension to be separated. As the belt passes beneath the chamber 24, electrophoresis and electro-osmosis will occur as previously described with reference to FIG. 3, and separated solids will accumulate around the anode mesh of the electrode assembly. When the relevant portion of the belt again emerges above the surface 30 it passes over the roller 42, where the weight of the suspended loop of belt and any superposed belts will cause the tubes 6 to collapse with the result that the accumulated solids are pressed out of the structure of the electrode assembly in a zone 50. The solids pressed out of the belts as they pass over the roller 42 are intercepted by a scraper blade 48 and collected by secondary removal means in the form of a belt conveyor 52. Upon leaving the roller 42, the belts are washed by spray heads 54, whereupon they re-engage the drive roller 40 for recirculation.

Where the roller 40 is driven only intermittently, it remains stationary whilst current is applied to the electrode assemblies forming the belts, and electrophoresis and electroosmosis are allowed to proceed until a substantial accumulation of separated solids has occured in the submerged portions of the electrode assemblies forming the belts. The current supply to the contacts 46 is then interrupted, and the motor driving the roller 40 is started, whereupon separation of the accumulated solids from the belts occurs in the manner already described. The roller 40 is driven at least until the portions of the belts loaded with solids have been withdrawn from the suspension, whereupon the process is repeated. Intermittent operation has the advantage that there is no disturbance of the accumulating solids during electrophoresis and electro-osmosis, whilst the contacts 46 are not required to transmit current to moving belts, thus simplifying their design and improving their reliability.

Besides the two embodiments particularly described, there are numerous further possible ways of putting the invention into effect. Electrode assemblies may be formed as a plurality of parallel discs or plates mounted on a hub or frame either floating or supported at any angle from horizontal to vertical in a pond, tank or channel to which the suspension to be treated is fed. The assembly so produced may be moved relative to the suspension, either linearly or rotationally, or the suspension may be caused to flow past the assembly. With such a multi plate or multi disc assembly, removal of accumulated solids may be achieved periodically by applying pressure to the assembly in a direction normal to the planes of the plates or discs, so as to collapse the spacer means in the electrode assemblies and squeeze out the solids.

In another arrangement, the suspension to be separated may be fed through a shallow channel between a stationary electrode plate forming the bottom of the channel and a moving electrode closing the top of the channel which electrode is one run of an endless belt of conductive mesh, the electrodes being polarized so that the solids from the suspension migrate to the moving mesh from which they can be removed on the upper run of the belt.

In a variant of this embodiment, both the upper and lower electrodes are stationary, but a moving belt of insulating mesh moves between the electrodes adjacent the positive electrode to convey out of the charge material consolidating on that electrode.

In all the embodiments described so far, electrically conductive electrodes have been used. However, it would be possible to carry out the purpose of the invention by setting up a directional electrical field between bounding structures of a non conductive material, for example by using electrostatically charged belts as bounding structures, the belts either being charged by brushing or spraying by means of a corona discharge, or by using other known methods of charge conveyance not dependentd upon conventional conductors. Such systems are potentially advantageous when handling suspensions which would corrode normal electrode materials, but have the disadvantage that it is difficult economically to handle sufficiently large currents to operate the process efficiently.

What I claim is:

1. A method of removing suspended particles from an aqueous suspension, comprising introducing a layer of a suspension of the particles between two generally parallel electrodes of an electrode assembly, setting up a DC electric field between the electrodes whereby to cause electrophoretic migration of the particles to one of said electrodes and electro-osmotic consolidation of the particles at said electrode, and separating from said electrode assembly the migrated particles accumulating at said one electrode, wherein the electrode assembly includes collapsible insulating spacer means separating the electrodes, and the electrode assembly is freed from accumulation of particles by collapsing said spacer means so as to press together said electrodes and squeeze out said particle accumulations.

2. A method according to claim 1, wherein the electrode assembly is moved away from a zone in which the migration of the particles takes place before separation of the accumulated particles.

3. A method according to claim 2, wherein the electrode assembly is formed as a belt, and including the steps of supporting the belt in the suspension, setting up a field between the electrodes of the belt so as to accumulate particles therein, and drawing the belt past a station at which the spacer means between the electrodes are collapsed so as to express particles accumulated within the belt.

4. A method according to claim 3, wherein the belt is maintained stationary whilst the field is applied between the electrodes, the field is removed, the belt is moved past the spacer collapsing station and returned to its original position, and the field is reapplied and the cycle repeated.

5. A method according to claim 1 wherein the distance between the electrodes is about ½ to 1 inch.

6. A method according to claim 5 wherein the electrodes are maintained at a potential difference of about 2–5 volts.

7. A method according to claim 1 wherein the electrodes are maintained at a potential difference of about 2–5 volts.

8. Apparatus for removing suspended particles from an aqueous suspension, comprising an assembly including two generally parallel electrodes and collapsible spacer means maintaining said electrodes separated by a distance which is very small compared with the linear dimensions of the electrodes, means for causing a suspension to be separated to flow into the space between the electrodes, means for connecting the electrodes to a DC electric supply whereby to cause particles suspended in the suspension to consolidate adjacent one of said electrodes, and means to collapse said spacer means to remove said accumulated particles from said one electrode.

9. Apparatus for removing suspended particles from an aqueous suspension, comprising an electrode assembly in the form of a belt having a laminar structure comprising two electrodes of electrically conductive mesh and a resiliently collapsible spacer means between the electrodes, the spacing between the electrodes maintained by the spacer means being very small compared with the linear dimensions of the electrodes, roller means disposed to support the belt formed by the electrode assembly so that a substantial part of the latter dips into the suspension, the roller means including a roller engagable with the electrode assembly under such pressure as to cause collapse of the spacer means, means for removing material squeezed out of the belt as a result of the collapse of the spacer means, means to drive the belt, means to supply current to the electrodes of said assembly, and framework means supporting said roller means, said drive means, said removal means and said current supply means.

10. Apparatus according to claim 9, wherein the roller means supports a plurality of electrode assemblies in the form of belts.

11. Apparatus according to claim 10, wherein the belts are connected electrically in series.

12. Apparatus according to claim 9 wherein said framework means includes flotation chambers whereby the apparatus may float in a pond or tank of suspension to be separated.

* * * * *